United States Patent Office 2,735,878
Patented Feb. 21, 1956

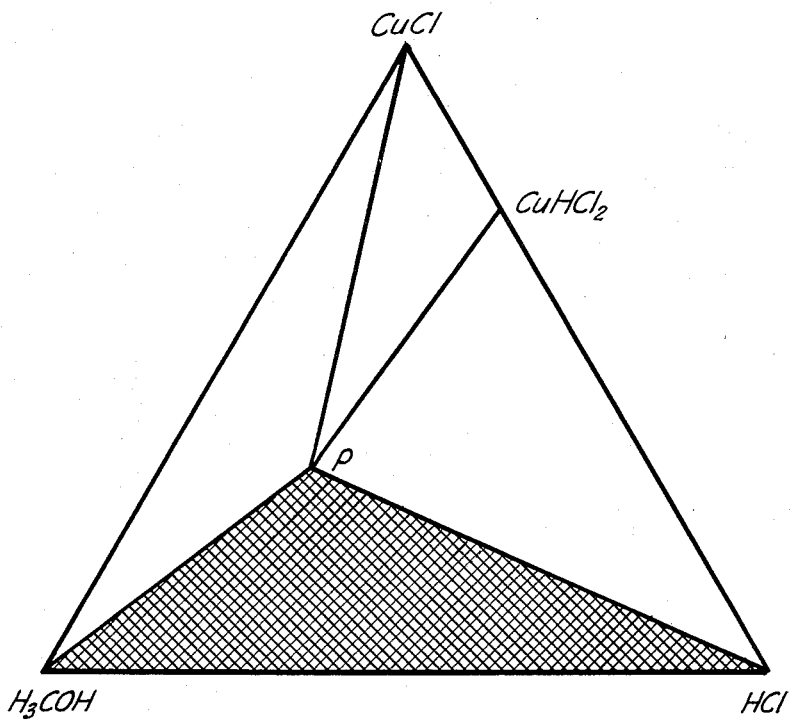
(SHADED AREA INDICATES SOLUTION)
INVENTOR.
ALFRED W. FRANCIS
BY
Robert D. Flynn
AGENT

2,735,878

SEPARATION OF OLEFINS FROM HYDROCARBON MIXTURES, AND SOLVENT THEREFOR

Alfred W. Francis, Woodbury, N. J., assignor to Socony Mobil Oil Company, Inc., a corporation of New York Application March 19, 1953, Serial No. 343,388

12 Claims. (Cl. 260—677)

This invention is concerned with a process for separating olefins from hydrocarbon mixtures containing the same. More specifically, the invention has to do with separating olefins from hydrocarbons by means of the preferential selectivity of cuprous halides for olefins.

It has been known for some time that gaseous olefins, such as ethylene, propylene, butenes and butadiene, can be separated from the corresponding $C_2$–$C_4$ paraffins by absorption in aqueous and some non-aqueous solutions of silver, mercury and cuprous salts. Certain silver solutions, such as solutions of silver nitrate, are satisfactory for the purpose, as demonstrated in my United States Letters Patent No. 2,077,041. However, it must be recognized that silver is relatively costly. Mercury solutions are disadvantageous because their reactions with olefins are irreversible, such that olefins cannot be recovered even though they can be segregated from the corresponding paraffins.

With regard to cuprous salts, a number of disadvantageous factors have been noted to date. Cuprous salts are almost insoluble in water. The solid halides form solid complexes with ethylene and propylene, but they are impractical to use to effect separation of the olefins for the following reasons:

(1) A solid reactant forms a crust of complex which prevents further contact of cuprous chloride with the olefin.
(2) After absorption of olefin from an olefin-paraffin mixture, the gas space in the container of the cuprous chloride contains unabsorbed gas consisting largely of paraffins. This gas cannot be removed without reducing the pressure, which would decompose the complex. It must be purged with a portion of the olefin, thus sacrificing much of the yield.

Cuprous salts can be brought into aqueous solution by means of ammonia, ammonium salts, organic amines, amides or other bases; however, the resulting solutions are generally characterized by a low capacity for olefins, because the concentration of cuprous salt in the solutions is low.

It has long been known that cuprous chloride can be brought into aqueous solution with hydrochloric acid alone or with ammonium salts. These solutions dissolve gaseous olefins and carbon monoxide, as described in the following references:

(a) M. Berthelot, Ann. chim. phys. (7) 23, 32 (1901).
(b) W. Manchot et al., Ann. 370, 286 (1909).
(c) J. Dubois, Przemysl Chem., 14, 313 (1930).
(d) E. R. Gilliland et al., Ind. Eng. Chem., 33, 1143–7 (1941).
(e) R. N. Keller, Chem. Rev. 28, 237, 245 (1941).

The maximum concentrations of olefins observed by Berthelot, (a) above, were 0.17 mol of ethylene and 0.25 mol of propylene, per mol of cuprous chloride. Those observed by Gilliland et al., (d) above, were 0.224 mol of ethylene and 0.0396 mol of propylene. The latter workers used a solution containing about fifteen per cent of cuprous chloride, fifteen per cent of ammonium chloride and eight per cent of hydrogen chloride.

The report made by Manchot et al., (b) above, teaches that in the absence of water cuprous chloride lacks the ability to combine with ethylene; and also teaches that with absolute alcohol, in spite of greater gas solubility, little combination of the gas (ethylene) with cuprous chloride takes place.

I have now discovered solutions having high capacities for absorbing olefins and having low solvent powers for paraffins. A novel solution comprises a cuprous halide, a liquid containing a hydroxyl group and a substantially anhydrous hydrogen halide.

Inasmuch as cuprous chloride and hydrogen chloride are much less expensive and have a greater capacity for olefins, than their related bromide salts and acids, respectively, the invention is illustrated hereinafter with reference to such chlorides. It is to be understood, nonetheless, that the corresponding cuprous bromide and the corresponding hydrogen bromide are also operative herein.

The solutions of this invention are prepared by admixing cuprous chloride, an anhydrous solvent, such as methanol, and anhydrous hydrogen chloride. As the hydrogen chloride is added, the cuprous chloride dissolves in the methanol. The solutions so formed tend to be black in color, attributed to the presence of a trace or small amount of cupric chloride. The latter also serves to increase the viscosity of the solutions. The black color, and trace amounts of cupric chloride, can be eliminated by keeping the solutions in the presence of copper turnings in the absence of air; as a result, the solutions become and remain colorless. Since contact with air causes the solutions to turn black again, such contact is to be avoided.

As indicated above, the anhydrous solvents used in the solutions of this invention are characterized by the presence of at least one and not more than two hydroxyl groups (—OH). Compounds having such a group include alcohols, glycols, alcohol ethers, halohydrins and acids. However, there are additional limitations upon the solvents; they are aliphatic in character and contain not more than about four carbon atoms per molecule (or have molecular weights not greater than about 100). Representative of the solvents contemplated herein are:

Alcohols:
    Methyl alcohol
    Ethyl alcohol
    n-Propyl alcohol
    Iso-propyl alcohol
Glycols:
    Ethylene glycol
    Propylene glycol
    Triethylene glycol
    Butene glycols
Alcohol ethers:
    Ethylene glycol monomethyl ether
      (Beta-methoxyethanol)
    Ethylene glycol monoethyl ether
      (Beta-ethoxyethanol)
Halohydrins and cyanohydrins:
    Ethylene cyanohydrin
    Ethylene chlorohydrin
Acids:
    Formic acid
    Acetic acid
    Hydroxyacetic acid (glycolic acid)

It is to be understood, of course, that mixtures of such solvents can also be used. By way of preference, the following are preferred herein, inasmuch as solutions made therewith have greater selectivity for olefins: methanol and ethylene glycol. In contrast, solutions made with ethyl alcohol, isopropyl alcohol and beta-methoxyethanol dissolve moderate amounts of paraffins and so are less selective for olefins.

As further recommendations regarding the novel solutions, traces of water in any of the reagents (cuprous chloride, solvent and/or hydrogen chloride) are not harmful, but substantial amounts of water diminish both the concentration of cuprous chloride and also its molar efficiency in dissolving olefins. In general, not more than about ten per cent by weight of water should be present in the total amount of reagents used. When an alcohol or an alcohol ether (e. g., beta-methoxyethanol) is used as the solvent, the solutions should be saturated with cuprous chloride and hydrogen chloride in order to provide the maximum capacity for olefins and also to salt out paraffins as much as possible.

In the presence of cuprous chloride, methanol reacts gradually with hydrogen chloride to form methyl chloride, as indicated below:

$$H_3COH + HCl \rightarrow H_3CCl + H_2O$$

This reaction not only consumes reagents ($H_3COH$ and $HCl$) and introduces undesirable water into the solution, but the methyl chloride (boiling point, $-23°$ C.) contaminates the olefin products on desorption (described below). However, this reaction and corresponding reactions involving other solvents can be retarded or even eliminated by using low temperatures, as from about $-20°$ C. to about $+10°$ C. and preferably about $0°$ C. The methyl chloride, if such is formed, can be separated from the olefin with which it is separated, and obtained as a useful by-product. As in the case of methanol, all of the solvents tend to react slowly with hydrogen chloride, to form chlorine derivatives. In most instances, however, such chlorine derivatives are less volatile than methyl chloride which, as indicated above, is formed from methanol. The chlorine derivatives of other solvents do not contaminate the olefin separated with the solutions containing such solvents, but accumulation of such chlorine derivatives can eventually make the solutions ineffective. Again, however, low temperatures obviate this interference.

Equilibria involved in the solution of cuprous chloride are illustrated by the ternary diagram in the attached drawing. Methanol is shown as the solvent. Cuprous chloride is insoluble in neutral methanol but becomes highly soluble in the presence of hydrogen chloride, the solubility being almost linear (from the methanol corner to P, most probably because of the formation of a complex such as $CuHCl_2$ which is soluble in methanol). The composition marked by point P is about 34.2 per cent cuprous chloride, 17.3 per cent hydrogen chloride and 48.5 per cent methanol (all reported as weight per cent). This is the maximum amount of cuprous chloride that can be brought into solution. Thus the composition at P contains about 1.4 mols of hydrogen chloride for one mol of cuprous chloride. Addition of more hydrogen chloride fails to increase the concentration of cuprous chloride since crystals (most probably $CuHCl_2$) begin to come out of the solution. The shaded area of the ternary diagram indicates solution. The solution has a strong odor of hydrogen chloride but pressure is not required to avoid hydrogen chloride evolution.

The composition identified by point P of the ternary diagram shown here, and of similar points of related ternary diagrams (not shown), and their solvent powers for propylene or propane at $0°$ C. are given below in the table:

TABLE

*Compositions and solvent powers of cuprous chloride solutions*

| Solvent | Composition, Wt. Percent | | | Solvent Power at 0° C., Wt. Percent | |
|---|---|---|---|---|---|
| | Solvent | CuCl | HCl | Propylene | Propane |
| Methanol | 48.5 | 34.2 | 17.3 | 13.5 | <1 |
| Ethanol | 61 | 26 | 13 | 14.5 | 4.5 |
| Isopropanol | 67.3 | 21.7 | 11 | | |
| Beta-Methoxyethanol | 62.9 | 26.6 | 10.5 | 12 | 1.9 |
| Beta-Chloroethanol | 82 | 12 | 6 | | |
| Ethylene Glycol | 63.5 | 24.3 | 12.2 | 3.0 | <0.5 |
| Ethylene Cyanohydrin | 44.25 | 54 | 1.75 | 2.7 | <0.5 |

As will be seen from inspection of the data in the table, in most of the solutions, the hydrogen chloride concentration (by weight) is about one-half of the cuprous chloride, or a molar ratio (HCl:CuCl) of 1.4:1. The ethylene cyanohydrin solution, however, requires only trifling amounts of hydrogen chloride, although cuprous chloride is insoluble in the solvent without hydrogen chloride. In spite of the high concentration of cuprous chloride in the latter solution, the solution has a relatively low solvent power for propylene. Moreover, the solution is quite viscous, as in the thylene glycol solution. These viscosities can be diminished considerably and the solvent power increased considerably by diluting the solutions with methanol or with beta-methoxyethanol. For example, a solution containing 1.75 parts (13.6 per cent) of ethylene cyanohydrin, 4.93 parts (38.7 per cent) of beta-methoxyethanol, 4.96 parts (38.8 per cent) of cuprous chloride and 1.14 parts (8.9 per cent) of hydrogen chloride, all parts by weight, was found to dissolve 0.97 part or 7.6 per cent of its weight of propylene. This solution dissolved a negligible amount of propane.

Separation of an olefin from a mixture of the same and other hydrocarbons is effected by contacting the mixture with a solution of the aforesaid character for a suitable period, whereupon the olefin is selectively absorbed by the solution and other hydrocarbons are rejected. The olefin so absorbed can be recovered from the solution by a suitable desorption procedure.

A preferred procedure involves contacting a cuprous chloride solution countercurrently with a liquid or gaseous hydrocarbon mixture, containing an olefin, while maintaining the solution and hydrocarbon mixture under a pressure of about 50 pounds per square inch in the case of propylene or 500 pounds in the case of ethylene, and at a low temperature of about $0°$ C., in a pressured vessel. Rejected hydrocarbons are removed from the vessel, and the solution is then desorbed by reducing the pressure, as to about atmospheric or lower, whereupon the absorbed olefin is evolved. While operating pressures of the order of about 50 or 500 p. s. i. and temperatures of about $0°$ C. are mentioned herein as preferred, it is to be noted that the pressure can vary from atmospheric to about 1000 p. s. i., depending on the olefin involved and temperatures can range from about $-20°$ C. to about $+25°$ C.

The olefins which are readily absorbed by the novel solutions of this invention contain from two to about six carbon atoms per molecule. Generally, however, the solutions are much more effective with ethylene and propylene than with higher olefins. Typical olefins, therefore, are: ethylene, propylene, 1-butene, 2-butene, isobutene, butadiene, pentenes and hexenes.

As shown herein, the solutions of this invention are desirable for separating olefins from mixtures of the same and paraffins. However, the process is also effective for so separating olefins from mixtures with naphthenes, aromatics, carbon dioxide and hydrogen, inasmuch as such compounds or substances do not react with, nor are extracted by, the solutions under the conditions of operation herein.

The following illustrative examples are set forth to demonstrate the selectivity of the novel solutions of this invention.

EXAMPLE I

A sample of the solution represented by P of the ternary diagram attached hereto was used. This solution comprises 34.2 per cent cuprous chloride, 17.3 per cent hydrogen chloride and 48.5 per cent methanol. The sample, 10.53 parts by weight, was sealed in a glass tube with 1.42 parts of pure liquid propylene and the tube was shaken. The temperature and pressure within the vessel were +25° C and 150 p. s. i., respectively. As determined from the amount of propylene which was not dissolved in the solution, namely, 0.19 part, the solubility of propylene was 11.75 per cent by weight of the solution at 25° C. At 0° C., all of the propylene charged originally—1.42 parts amounting to 13.5 per cent of the solution—was dissolved. Propylene was evolved quantitatively from the solution by reducing the pressure to atmosphere.

By way of comparison, then, the solution used here is 80 per cent active at 25° C. and is 93 per cent effective at 0° C. in adsorbing propylene on a mol per mol basis, as compared with 25 per cent observed by Berthelot, (a) above, and 4 per cent by Gilliland et al., (d) above, with their respective solutions at 8° C. or 26.2° C., respectively. Berthelot required 63 days to attain his value.

Another sample of the solution used above—here, 14.31 parts by weight—was sealed in a tube at +25° C. and 150 p. s. i. with 0.66 part of propane. The vessel was shaken and then placed in a fixed position for a period of thirty minutes. The original interface between the solution and the propane was unchanged, indicating no noticeable amount of dissolved propane.

EXAMPLE II

Another sample of the cuprous chloride solution described in Example I was used. This sample, 138.81 parts by weight or 90 parts by volume, was charged to a visual autoclave and ethylene was added thereto. The temperature and pressure within the autoclave were +25° C. and 1000 p. s. i. As the ethylene dissolved in the solution more ethylene was introduced under pressure until the liquid volume within the autoclave was 110 volumes, and the pressure was 580 p. s. i., after agitation at 25° C. The autoclave was then exhausted gradually by releasing the valve, with ethylene being evolved therefrom, a total of 10,800 volumes of ethylene. This is 92 per cent of the expected capacity, 11,760 volumes, on a mol per mol basis, corresponding to 0.49 mol or 48.5 parts by weight of cuprous chloride which was dissolved in the solution.

EXAMPLE III

Another sample, 8.59 parts by weight, of the cuprous chloride solution used in Example I was contacted in a single stage at 23° C. with 2.5 parts of a hydrocarbon mixture containing 28.8 per cent by weight of propylene and 71.2 per cent propane. The amount of propylene dissolved was 0.22 part which on separation and analysis was found to be 80 per cent propylene. The undissolved hydrocarbon was only 22 per cent propylene.

I claim:

1. A solution characterized by a high selectivity for olefins as opposed to paraffins, which consists essentially of: cuprous chloride and anhydrous hydrogen chloride dissolved in methyl alcohol.

2. A solution characterized by a high selectivity for olefins as opposed to paraffins, which comprises: about 34.2 per cent by weight of cuprous chloride, about 17.3 per cent by weight of anhydrous hydrogen chloride and about 48.5 per cent by weight of methyl alcohol.

3. The process for preparing a solution characterized by a high selectivity for olefins as opposed to paraffins, which comprises: admixing cuprous chloride with methyl alcohol, and adding thereto anhydrous hydrogen chloride, the quantities of said compounds being such that the solution comprises about 34.2 per cent by weight of cuprous chloride, about 17.3 per cent by weight of anhydrous hydrogen chloride and about 48.5 per cent by weight of methyl alcohol.

4. The process for separating an olefin from a hydrocarbon mixture containing the same and at least one hydrocarbon other than an olefin, said olefin having from two to about six carbon atoms per molecule, which comprises: contacting said mixture with a cuprous chloride solution, whereupon said olefin is preferentially extracted from said hydrocarbon mixture; said cuprous chloride solution comprising cuprous chloride and hydrogen chloride, dissolved in methyl alcohol; the composition of said solution being about 34.2 per cent by weight of cuprous chloride, about 17.3 per cent by weight of hydrogen chloride and about 48.5 per cent by weight of methyl alcohol.

5. The process for recovering an olefin from a hydrocarbon mixture containing the same and at least one hydrocarbon other than an olefin, said olefin having from two to about six carbon atoms per molecule, which comprises: contacting said mixture with a cuprous chloride solution comprising cuprous chloride and hydrogen chloride, dissolved in methyl alcohol, the composition of said solution being about 34.2 per cent by weight of cuprous chloride, about 17.3 per cent by weight of hydrogen chloride and about 48.5 per cent by weight of methyl alcohol, whereupon said olefin is preferentially absorbed by said solution and said other hydrocarbon is rejected thereby; separating said solution and said rejected hydrocarbon; and desorbing said solution, whereupon said olefin is evolved.

6. A solution characterized by a high selectivity for olefins as opposed to paraffins, which consists essentially of: cuprous chloride and hydrogen chloride, dissolved in a substantially anhydrous aliphatic organic compound containing at least one and not more than about two hydroxy groups per molecule, and containing at least one and not more than about four carbon atoms per molecule, and selected from the group consisting of said organic compounds and mixtures thereof, the said organic compounds consisting of halohydrins containing only the elements carbon, hydrogen, oxygen and halogen; and alcohols, glycols, ether alcohols, and acids all of which contain only the elements carbon, hydrogen and oxygen.

7. The process for separating an olefin from a hydrocarbon mixture containing the same and at least one hydrocarbon other than an olefin, said olefin having from two to about six carbon atoms per molecule, which consists essentially of: contacting said mixture with a cuprous chloride solution, whereupon said olefin is preferentially extracted from said hydrocarbon mixtures; said cuprous chloride solution consisting of cuprous chloride and hydrogen chloride, dissolved in a substantially anhydrous organic solvent containing at least one and not more than two hydroxyl groups per molecule, and containing at least one and not more than about four carbon atoms per molecule and selected from the group consisting of said organic compounds and mixtures thereof, the said organic compounds consisting of halohydrins containing only the elements carbon, hydrogen, oxygen and halogen; and alcohols, glycols, ether alcohols, and acids all of which contain only the elements carbon, hydrogen and oxygen.

8. The process for recovering an olefin from a hydrocarbon mixture containing the same and at least one hydrocorbon other than an olefin, said olefin having from two to about six carbon atoms per molecule, which consists essentially of: contacting said mixture with a cuprous chloride solution, whereupon said olefin is preferentially absorbed by said solution and said other hydrocarbon is rejected thereby, said cuprous chloride solution consisting of cuprous chloride and hydrogen chloride dissolved in a substantially anhydrous organic compound containing at least one and not more than two hydroxyl groups per molecule and containing at least one and not more than about four carbon atoms per molecule, as solvent, and selected from the group consisting of said organic compounds and mixtures thereof, the said organic compounds consisting of halohydrins containing only the elements carbon, hydrogen, oxygen, and halogen; and alcohols, glycols, ether alcohols, and acids all of which contain only the elements carbon, hydrogen and oxygen.

9. The process for preparing a solution characterized by a high selectivity for olefins as opposed to paraffins, which comprises: admixing cuprous chloride with methyl alcohol, and adding thereto anhydrous hydrogen chloride in sufficient quantity to dissolve said cuprous chloride, the solution so formed being substantially free of any other ingredients.

10. The process for separating an olefin from a hydrocarbon mixture containing the same and at least one hydrocarbon other than an olefin, said olefin having from 2 to about 6 carbon atoms per molecule, which comprises: contacting said mixture with a cuprous chloride solution, whereupon said olefin is preferentially extracted from said hydrocarbon mixture; said cuprous chloride solution consisting essentially of cuprous chloride and hydrogen chloride, dissolved in methyl alcohol.

11. The process for recovering an olefin from a hydrocarbon mixture containing the same and at least one hydrocarbon other than an olefin, said olefin having from two to about six carbon atoms per molecule, which comprises: contacting said mixture with a cuprous chloride solution consisting essentially of cuprous chloride and hydrogen chloride, dissolved in methyl alcohol, whereupon said olefin is preferentially absorbed by said solution and said other hydrocarbon is rejected thereby; separating said solution and said rejected hydrocarbon; and desorbing said solution, whereupon said olefin is evolved.

12. The process for preparing a solution characterized by a high selectivity for olefins as opposed to paraffins, which comprises: admixing cuprous chloride and a substantially anhydrous aliphatic organic compound containing at least one and not more than two hydroxyl groups, and containing at least one and not more than four carbon atoms per molecule, and selected from a group consisting of said organic compounds and mixture thereof, the said organic compounds consisting of halohydrins containing only the elements carbon, hydrogen, oxygen and halogen; and alcohols, glycols, ether alcohols, and acids all of which contain only the elements carbon, hydrogen and oxygen; and adding thereto a hydrogen halide in sufficient quantities to dissolve said cuprous chloride, said hydrogen halide being selected from the group consisting of hydrogen chloride and hydrogen bromide; the solution so formed being substantially free of any other ingredients.

References Cited in the file of this patent

UNITED STATES PATENTS

| | | |
|---|---|---|
| 2,376,239 | Evans et al. | May 15, 1945 |
| 2,557,923 | Ray et al. | June 26, 1951 |
| 2,561,822 | Savoy | July 24, 1951 |